Figure 1:
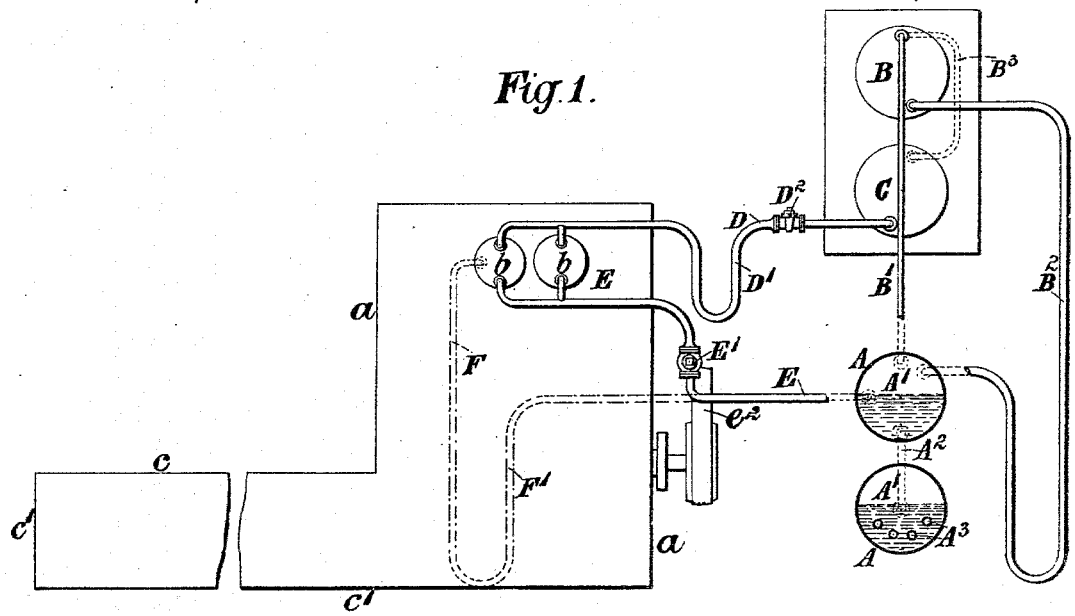

(No Model.)  3 Sheets—Sheet 1.

F. B. HILL.
REFRIGERATING APPARATUS.

No. 511,239.  Patented Dec. 19, 1893.

(No Model.) 3 Sheets—Sheet 2.
F. B. HILL.
REFRIGERATING APPARATUS.
No. 511,239. Patented Dec. 19, 1893.
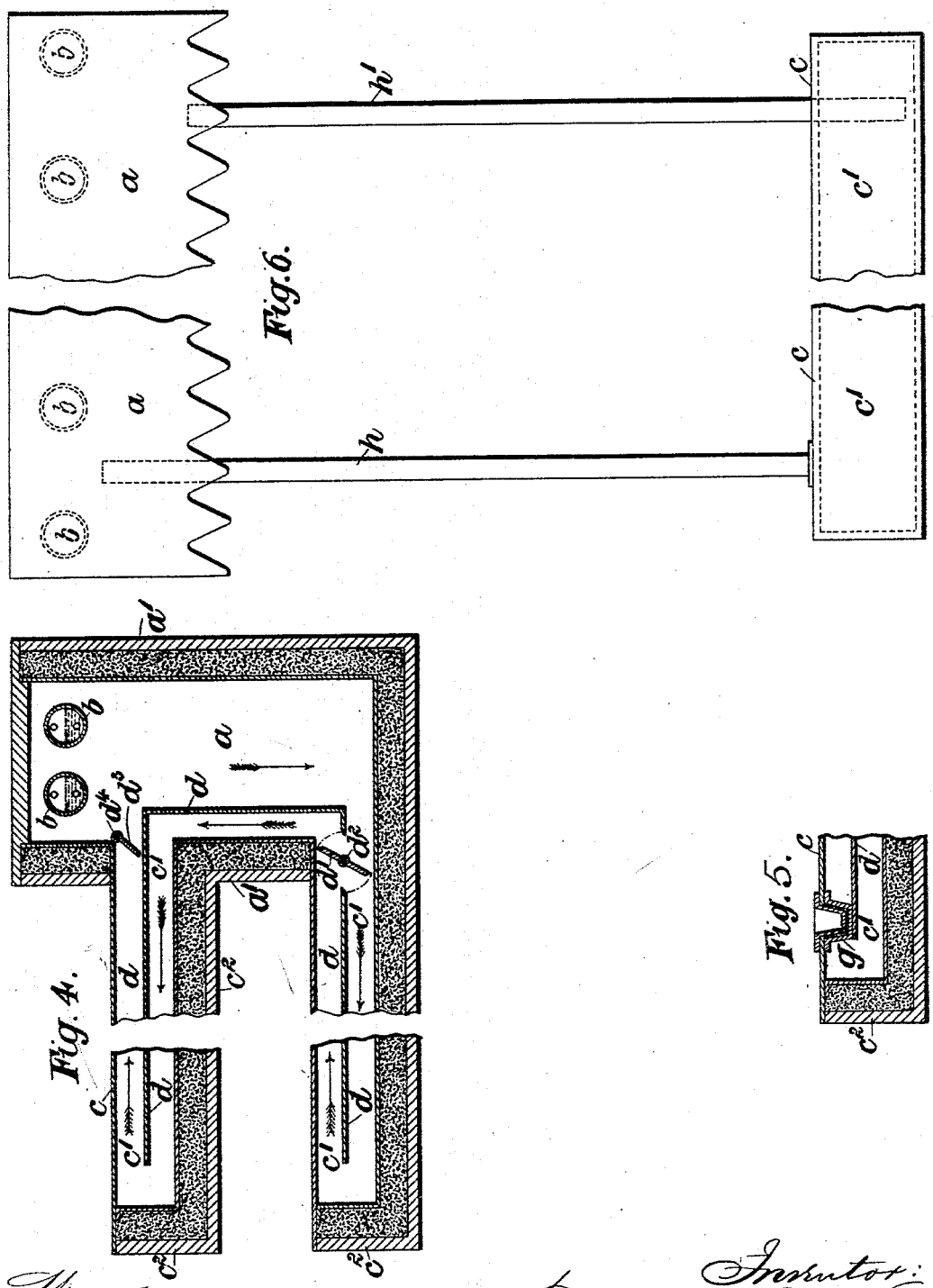

(No Model.)  3 Sheets—Sheet 3.

F. B. HILL.
REFRIGERATING APPARATUS.

No. 511,239.  Patented Dec. 19, 1893.

Witnesses:  Inventor:
J. A. Rutherford.  Frederick B. Hill.
Robert Everett.  By James L. Norris.
  Attorney.

UNITED STATES PATENT OFFICE.

FREDERICK BARKER HILL, OF LONDON, ENGLAND, ASSIGNOR TO THE HILLS COLD STORAGE COMPANY, LIMITED, OF SAME PLACE.

REFRIGERATING APPARATUS.

SPECIFICATION forming part of Letters Patent No. 511,239, dated December 19, 1893.

Application filed June 9, 1892. Serial No. 436,164. (No model.) Patented in England December 27, 1889, No. 20,811.

*To all whom it may concern:*

Be it known that I, FREDERICK BARKER HILL, engineer, a subject of the Queen of Great Britain, residing at London, England, have invented new and useful Improvements in Refrigerating Apparatus, (for which I have obtained a patent in Great Britain, No. 20,811, bearing date December 27, 1889,) of which the following is a specification, reference being had to the accompanying drawings.

My invention relates to refrigerating apparatus, and is chiefly designed to facilitate and expedite the production of chocolate and other substances which require to be cooled or reduced in temperature during the process of manufacture, and to provide for cooling such chocolate or other substances by means of apparatus which is also used for the production of cold for other purposes.

My said invention is particularly serviceable in the manufacture of chocolate, confectionery, pastry and other substances which are formed in molds, and the production of which has hitherto been a comparatively slow and expensive process by reason of the length of time required to cool the molds containing such substances, and the necessity for the use of a very large number of such molds to permit the manufacture to be continuously carried on, several sets of molds having to be filled while the contents of other sets are cooling.

By my invention I provide for very rapidly cooling the contents of the molds, so that the said molds can be used much more frequently than heretofore and a much smaller number of them will be required. Moreover my said invention can be used with great advantage in the manufacture of substances which require to be very rapidly cooled. I accomplish the desired result by combining with suitable apparatus for the production of cold, one or more slabs or tables which are formed of metal or other suitable material of good thermal conductivity, and beneath which circulates brine or other non-congealable liquid for conveying the cold from the refrigerating tubes or chambers to the said slabs or tables. The chocolate and other substances to be treated are placed upon these slabs or tables, and will be rapidly cooled by the liquid circulating beneath the same.

My said invention, therefore, consists partly in the combination of a heat-conducting plate, a chamber beneath the said plate, a tank or vessel for containing a non-congealable liquid and communicating with the said chamber, refrigerating tubes connected with an apparatus for the production of cold and arranged within the said tank above the level of the heat-conducting plate, whereby the said liquid will be cooled and a proper circulation of the same in contact with the said heat-conducting plate effected by gravity without the aid of a pump, the said tubes being preferably adapted to contain a large body of liquid anhydrous ammonia.

My said invention also consists partly in the combination with the heat-conducting plate, the chamber beneath the same, the tank communicating with the said chamber, and the refrigerating tubes arranged within the said tank, of a chamber above the said plate for holding a large body of cold air in which the chocolate or other substance can be very rapidly cooled.

My said invention further consists in the combination, with the heat conducting plate and the tank extending beneath the same, of partitions in the said tank for insuring the efficient circulation of the non-congealable liquid, which partitions are, if desired, provided with gates or valves for regulating or controlling the circulation of the non-congealable liquid.

In the accompanying drawings I have shown how my said invention may be conveniently and advantageously carried into practice.

Figure 2:
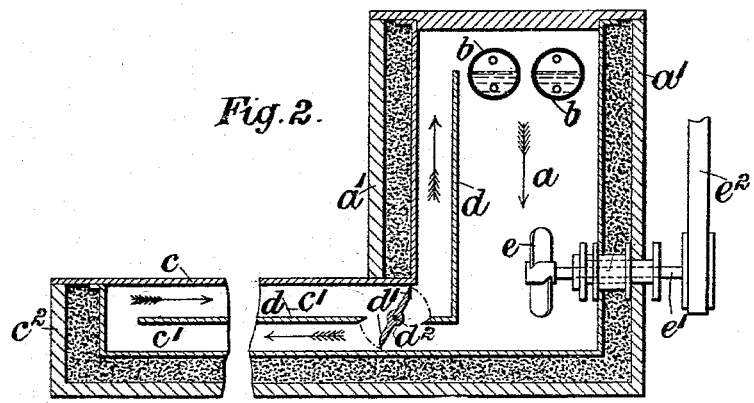
Figure 3:
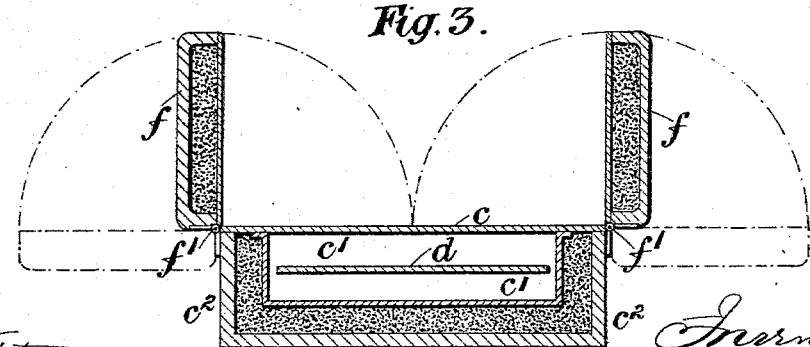

Figure 1 is a side elevation, partly in vertical section, of one form of my improved apparatus. Fig. 2 is a vertical longitudinal section of a portion of the said apparatus. Fig. 3 is a transverse section showing the cooling slab or table provided with covering pieces or flaps hereinafter described. Fig. 4 is a vertical longitudinal section illustrating another form or modification of my said apparatus wherein I employ two artificially cooled slabs or tables arranged one above the other. Fig. 5 is a vertical longitudinal section; and Fig.

Figure 7:
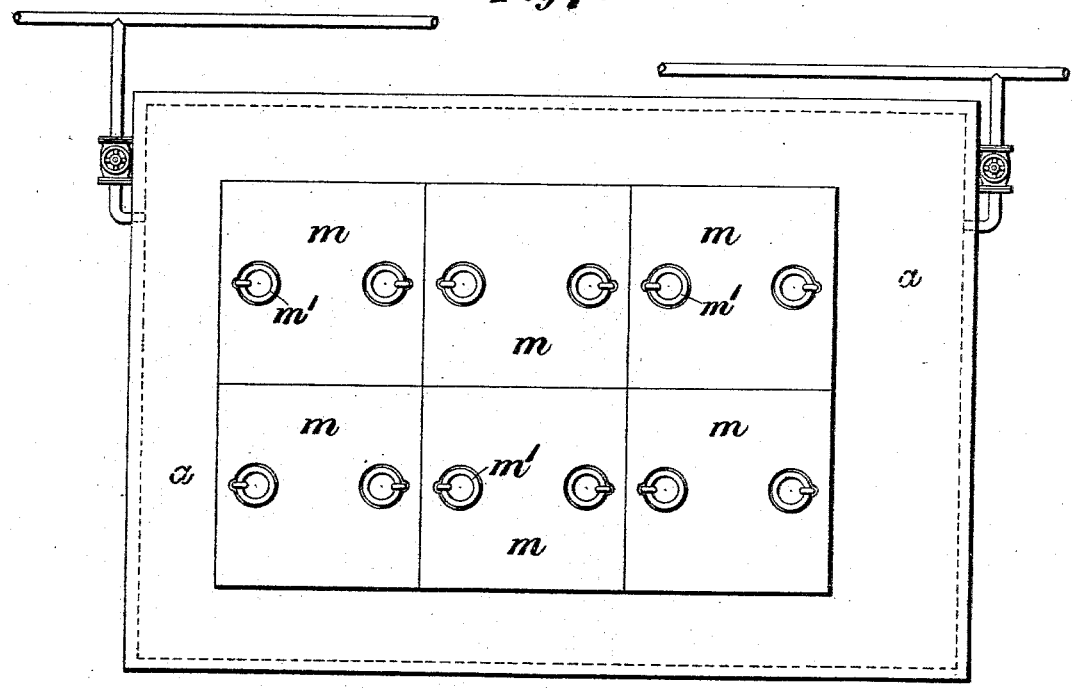

6 is a front elevation, showing other modifications of the apparatus. Fig. 7 is a plan, and Fig. 8 a sectional elevation illustrating a still further modification of my invention.

Like letters indicate corresponding parts throughout the drawings.

$a$ is a tank or vessel for containing brine or other non-congealable liquid.

$b, b$ are refrigerating tubes or chambers, which are immersed in the said liquid and which are connected with suitable apparatus for the production of cold. These tubes or chambers $b$ are arranged just below the level of the liquid in the tank $a$, but above the level of the heat-conducting plate $c$, so that, as the liquid is cooled, it will descend to the lower part of the tank and into the chamber $c'$ beneath the said heat-conducting plate, and thus a proper circulation of the liquid beneath the plate $c$ will be maintained by gravity without the aid of a pump. I prefer to use for this purpose, apparatus such as that described and illustrated in the specification of former Letters Patent dated December 1, 1891, No. 464,434, in which the cold is produced by the ammonia absorption process and wherein the whole of the liquid anhydrous ammonia is first collected in the refrigerating tubes or chambers and is then allowed to expand, as required, to reduce the temperature of the brine or other non-congealable liquid, suitable cocks or valves being provided in the pipes leading to and from the said tubes or chambers to control the expansion of the ammonia and thus maintain a constant or uniform low temperature.

$c, c$ are the slabs or tables, beneath which the said brine or other non-congealable liquid circulates for the purpose of cooling the chocolate or other substances, which may be placed upon the said slabs or tables in molds or other suitable receptacles.

In the apparatus shown in Figs. 1 and 2, A is the ammonia boiler or still, which is formed of two horizontal tubes $A'$ connected by suitable pipes $A^2$. These pipes extend longitudinally within the said tubes $A'$, and the horizontal parts of the said pipes are perforated on their upper sides to insure uniformity in the action of the apparatus. The lower tube $A'$ is, moreover, provided with suitable pipes $A^3$ for the circulation of steam or hot water for the purpose of heating the ammoniacal liquor in the boiler. B is the separator or rectifier, which is connected with the boiler or still A by the pipes $B'$, $B^2$. C is the cooler or condenser, which is connected by the pipe $B^3$ with the said separator or rectifier. D is a pipe which connects the condenser C with the refrigerating tubes or chambers $b$, and which is provided with a bend or trap $D'$ to prevent the flow of gas from the condenser into the said tubes. The pipe D is, moreover, provided with a cock or valve $D^2$ for controlling the flow of the liquid ammonia and the return of the ammoniacal gas through the same. The refrigerating tubes $b$ are connected with the boiler or still A by a pipe E provided with a cock or valve $E'$ for permitting the return of ammoniacal liquor from the said tubes into the boiler or still when required. The said cocks or valves are constructed with suitable casings or covers which can be firmly secured so as to form hermetical joints and prevent any leakage of ammonia, and which can be released and turned with the plug of the cock or the spindle of the valve, when it is desired to open or close the said cock or valve. The slab or table $c$ forms the top or cover of the chamber $c'$ which is in communication with the tank or vessel $a$.

For insuring the effectual circulation of the liquid in the chamber $c'$ I provide a partition $d$ arranged as shown, so that the liquid cooled by the refrigerating tubes $b$ will descend on one side of the vertical portion of the said partition and flow beneath the horizontal portion thereof, and will then rise and flow back between the said partition and the slab or table $c$ and ascend on the other side of the said vertical portion of the partition, as indicated by the arrows in Fig. 2, and will then be again cooled by contact with the refrigerating tubes $b$. I provide a trap-plate or valve $d'$ in a convenient part of the partition $d$, which valve is movable about a pivot or axis $d^2$ and is provided with suitable means by which it can be adjusted from the exterior of the apparatus to shut off or open communication between the tank $a$ and chamber $c'$. When the chamber $c'$ is thus shut off the apparatus can be used simply for cooling a room or chamber, or for the production of ice.

To increase the circulation of the liquid, I sometimes employ a rotating screw $e$ fixed upon a shaft $e'$ which extends through a suitable stuffing-box in the side of the tank or vessel $a$ and which may be driven by means of a belt $e^2$ from any suitable motor.

The operation of the apparatus shown in Figs. 1 and 2 is as follows, viz:—On heat being applied to the ammoniacal liquor in the boiler A by the circulation of steam or hot water through the pipes $A^3$, some of the said liquor from the lower tube $A'$ is first forced through the pipe $A^2$ into the upper tube $A'$ until the level of the liquor in the said lower tube is below the perforations in the lower part of the said pipe $A^2$, and the level of the liquor in the upper tube $A'$ is above the perforations in the upper part of the said pipe as shown in Fig. 1. Ammoniacal gas is then forced through the said pipe $A^2$ and rises through the liquor in the upper tube $A'$ above the upper portion of the said pipe; the gas is thus well washed. The said gas then flows through the pipe $B'$ into the rectifier B and thence through the pipe $B^3$ into the condenser, in which it is liquefied. Any liquid which may collect in the rectifier B returns to the boiler A through the pipe $B^2$. The anhydrous liquid ammonia flows through the pipe D into the refrigerating tubes $b$. The impoverished liquor in the boiler A is then cooled by the circulation of cold water through the pipes A³, and, as soon as the pressure is sufficiently diminished, the liquid ammonia in the tubes $b$ is allowed to volatilize, thus producing cold and reducing the temperature of the brine in the tank $a$; the ammoniacal gas from the tubes $b$ passes through the pipe D, the condenser C and rectifier B back into the boiler A, in which it is absorbed by the impoverished ammoniacal liquor. Or, if the immediate production of cold is not required, the cock or valve D² is closed after the anhydrous liquid has been collected in the refrigerating tubes B, and the liquor in the boiler A is then allowed to cool. More or less cold can then be produced, when required, and the brine in the tank $a$ thus reduced to any desired temperature, by opening the said cock or valve D² and keeping the same open for a longer or shorter period.

In some instances I dispense entirely with cocks or valves and substitute for the pipe E, a pipe F, shown in dotted lines in Fig. 1, provided with a trap F′ which must be of greater length or depth than the trap D′ in order to prevent the return of gas from the tubes $b$ to the boiler A through the said pipe F, and the conveyance of heat from the boiler A to the refrigerating tubes $b$. The said pipe F serves for the return of any surplus liquid ammonia from the said tubes $b$.

The brine or other non-congealable liquid cooled by contact with the tubes $b$ descends and flows through the chamber $c'$ first below and then above the partition $d$, and then ascends in the tank $a$ through the space between the vertical portion of the partition $d$ and the adjacent side of the said tank, as indicated by the arrows in the drawings.

I find it advantageous, in some cases, to provide my apparatus with covering pieces or flaps $f$, as shown in Fig. 3, which are hinged or pivoted at $f'$ to the edges of the table $c$, or are otherwise conveniently attached to the said table. These flaps are so arranged that they can be raised into the position shown, or folded down upon the surface of the table to form a cover therefor, or turned down so that their inner surfaces are level with the top of the table and form extensions thereof, as shown by the dotted lines. When raised to the vertical position shown by full lines in Fig. 3, the said flaps form the sides of a chamber $j$ over the table, which chamber will contain a large body of cold air, the said flaps or sides of the chamber preventing access of the warmer air outside, to the space immediately over the said table. A cool chamber can thus be readily provided, in which confectionery or other articles may be rapidly cooled.

I sometimes combine more than one table $c$ with a single tank $a$, as shown in Fig. 4. In this case the upper chamber $c'$ is provided with a trap-plate or valve $d^3$, which is pivoted at $d^4$, and whereby the circulation of the liquid through the said tank may be controlled.

I find it advantageous to provide the apparatus shown in Fig. 4 with flaps similar to those shown in Fig. 3, extending from the lower table $c$ to the bottom of the upper part $c'$ of the tank, thus forming between the two chambers $c'$ a closed chamber for containing cold air.

The slab or table $c$ is in some cases provided with a series of conical or other suitably shaped depressions or pockets $g$, as shown for example in Fig. 5, adapted to receive the substance to be cooled or the molds containing the said substance. To prevent too rapid reduction of the temperature of the said substance, I sometimes introduce sand or some other suitable non-conductor of heat into the space between the depression or pocket $g$ and a casing or jacket surrounding the same. An advantage of this form of my apparatus is that the molds containing the substance to be cooled are not so liable to be accidentally overturned as when they are merely supported on a plane surface.

In Fig. 6 I have shown a further modification of my improved apparatus, in which the tank or vessel $a$ is utilized for cooling the room or chamber in which the chocolate or other substance is to be treated, or for cooling a separate room or chamber. The said tank or vessel containing the non-congealable liquid and the refrigerating tubes $b$ is so arranged that the bottom of the said tank forms the ceiling of the room to be cooled. The bottom of the said tank is preferably corrugated to increase the strength thereof and the area of its cooling surface. The chamber $c'$ is arranged at a suitable distance below the tank $a$ connected therewith by means of pipes $h\ h'$ so that a circulation of the liquid between the tank $a$ and the chamber $c'$ will be maintained by gravity without the aid of a pump. The slab or table $c$ shown in this figure may, if desired, be provided with hinged covering pieces or flaps as shown in Fig. 3.

Figure 8:
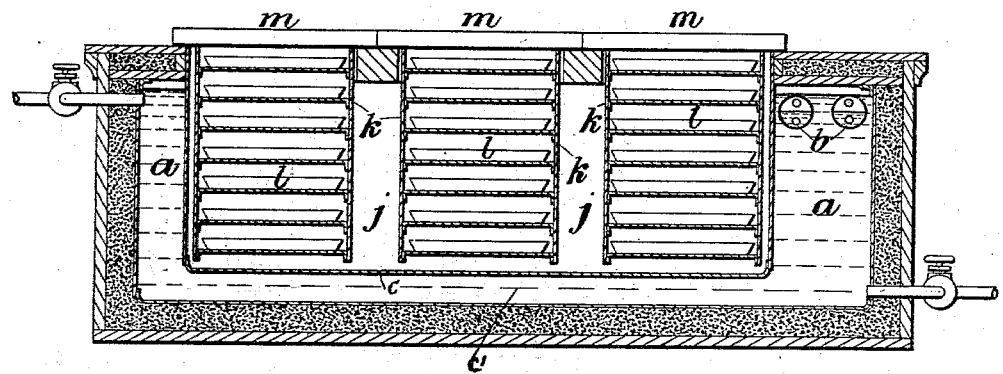

I sometimes inclose in the tank or vessel $a$ Figs. 7 and 8 a cold air-chamber $f$ the bottom $c$ of which will serve as a slab or table whereon to place the chocolate or other substances to be cooled. The interior of the chamber $j$, moreover, serves for containing a large body of cold air. I find it advantageous to arrange in the said chamber $j$ a number of racks $k$ for holding trays $l$ for containing the chocolate or other substances to be cooled. These racks are connected at their upper ends with square or other suitably shaped pieces $m$ which form parts of the cover of the chamber $j$, and which are provided with handles $m'$ whereby the racks $k$ may be conveniently removed and replaced. I arrange in the space between the said tank $a$ and chamber $j$ suitable refrigerating tubes or chambers $b$ connected as above described with a cold-producing apparatus.

It is obvious that I can somewhat further modify the construction of my improved apparatus without departing from the nature of my said invention.

What I claim is—

1. The combination in an apparatus for rapidly cooling chocolate and other substances, of a heat-conducting plate $c$, a chamber $c'$ beneath the said plate, a tank $a$ for containing a non-congealable liquid and communicating with the said chamber, refrigerating tubes $b$ connected with an apparatus for the production of cold and arranged within the said tank above the level of the said heat-conducting plate, whereby the said liquid is cooled and its circulation beneath the said plate effected by gravity without the use of a pump, substantially as hereinbefore described.

2. The combination in an apparatus for rapidly cooling chocolate and other substances, of a heat-conducting plate $c$, a chamber $c'$ beneath the said plate, a tank $a$ for containing a non-congealable liquid and communicating with the said chamber, refrigerating tubes $b$ connected with an apparatus for the production of cold and arranged within the said tank above the level of the heat-conducting plate, and a partition $d$ in the said tank $a$ and chamber $c'$ for insuring the proper circulation of the said liquid, substantially as and for the purposes above specified.

3. The combination in an apparatus for rapidly cooling chocolate and other substances, of a heat-conducting plate $c$ a tank $a$ extending beneath the said plate, and a partition $d$ in the said tank for insuring a proper circulation of the liquid therein, and gates or valves $d'$ in the said partitions for regulating or controlling such circulation, substantially as and for the purposes above specified.

FREDERICK BARKER HILL.

Witnesses:
  DAVID YOUNG,
  JOHN T. KNOWLES,
*Both of 11 and 12 Southampton Buildings, London, W. C.*